United States Patent [19]

Gagné

[11] Patent Number: 4,965,959
[45] Date of Patent: Oct. 30, 1990

[54] PEST TRAPPING AND EXTERMINATION SYSTEM

[76] Inventor: Albert P. Gagné, P.O. Box 941, Brownsburg, Quebec, Canada, J0V 1A0

[21] Appl. No.: 367,933
[22] Filed: Jun. 19, 1989
[51] Int. Cl.⁵ .................... A01M 23/16; A01M 23/18
[52] U.S. Cl. ........................................... 43/61; 43/58; 43/64
[58] Field of Search ................ 43/58, 61, 64, 131, 43/107, 124, 132.1

[56] References Cited

U.S. PATENT DOCUMENTS

| | | | |
|---|---|---|---|
| 3,591,972 | 7/1971 | Hess | 43/58 |
| 3,900,983 | 8/1975 | Petrosky | 43/58 |
| 4,062,142 | 12/1977 | Marotti | 43/61 |
| 4,138,796 | 2/1979 | Souza | 43/61 |
| 4,349,981 | 9/1982 | Sherman | 43/131 |
| 4,566,218 | 1/1986 | Kurosawa | 43/58 |
| 4,596,087 | 6/1986 | Pratscher | 43/64 |
| 4,653,221 | 3/1987 | Pratscher | 43/64 |
| 4,741,121 | 5/1988 | Pratscher | 43/58 |

Primary Examiner—Kurt Rowan

[57] ABSTRACT

A pest trapping and extermination system comprising an elongated enclosed conduit member having attachment members for securing same against a wall in an area where pests are to be trapped. A directing device is secured to the conduit member for directing pests entering the conduit in a predetermined direction. One or more entrances are provided in the conduit for access to the interior thereof. Closures are provided to cut off access to the entrances from the interior of the conduit. An extermination device is associated with the conduit to destroy the pests trapped therein.

14 Claims, 5 Drawing Sheets

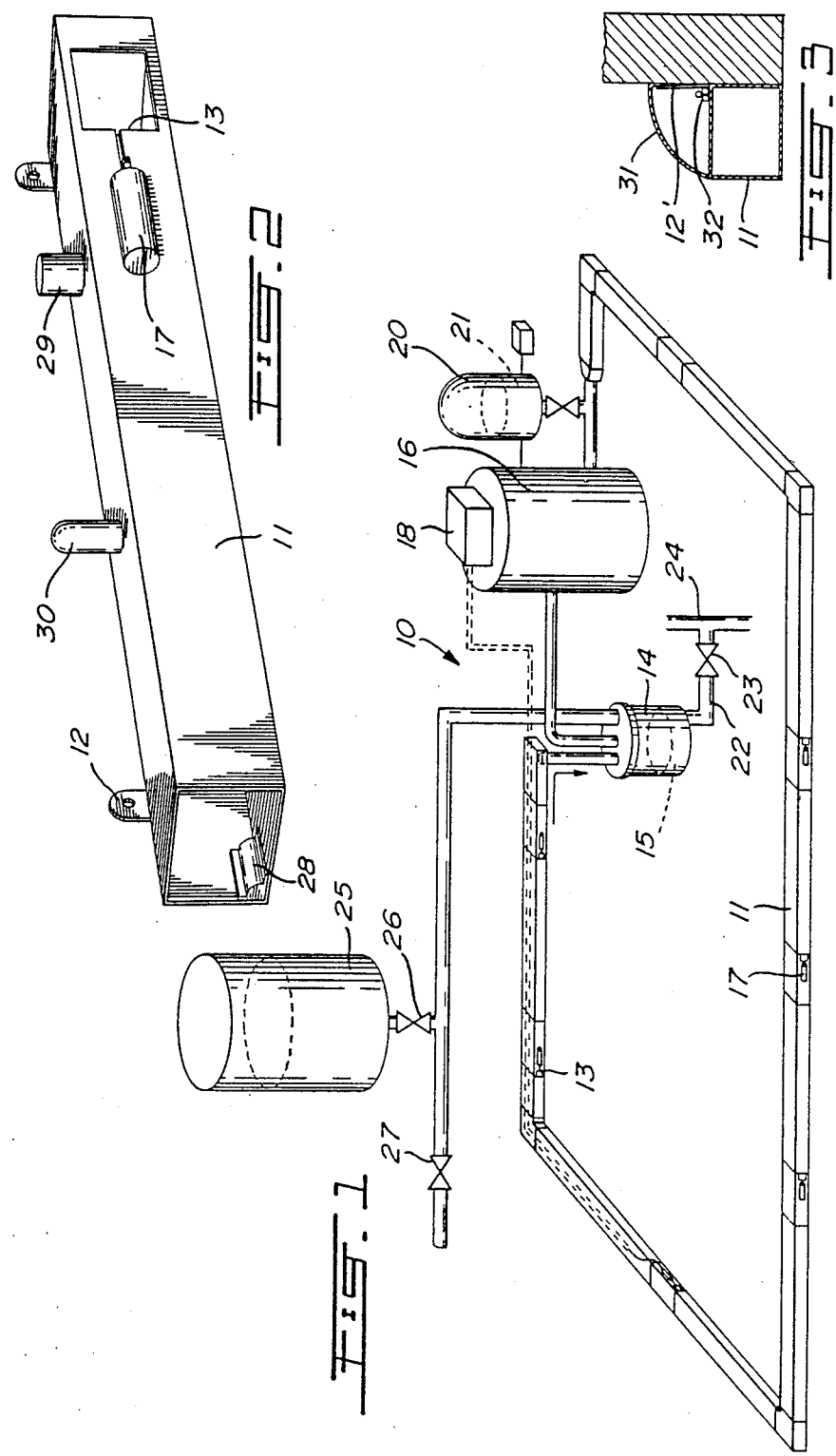

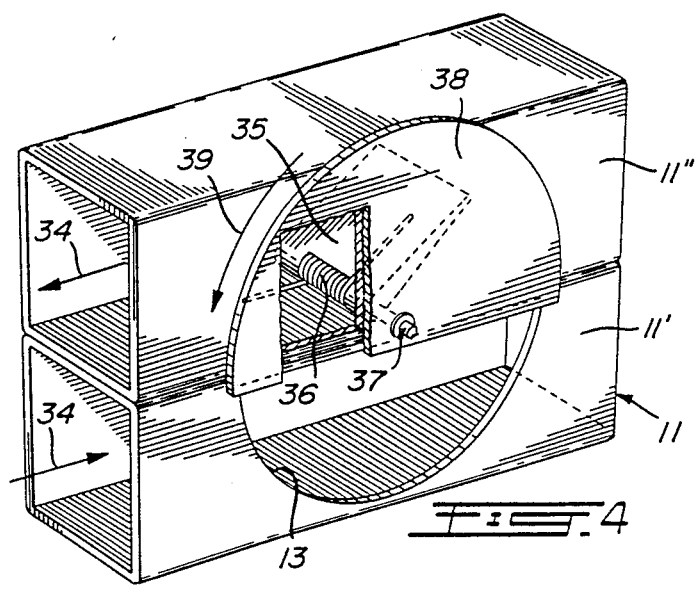
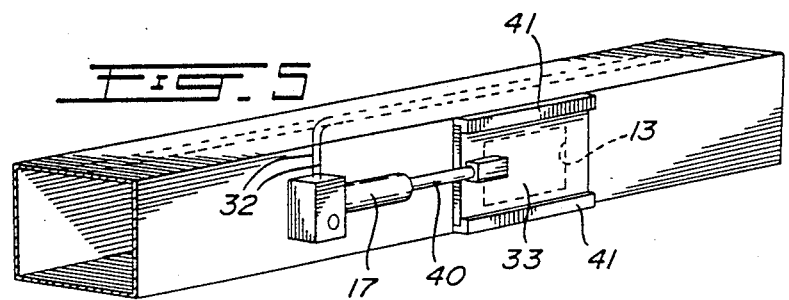
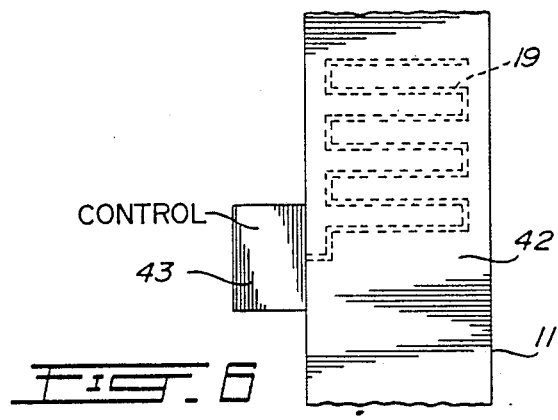

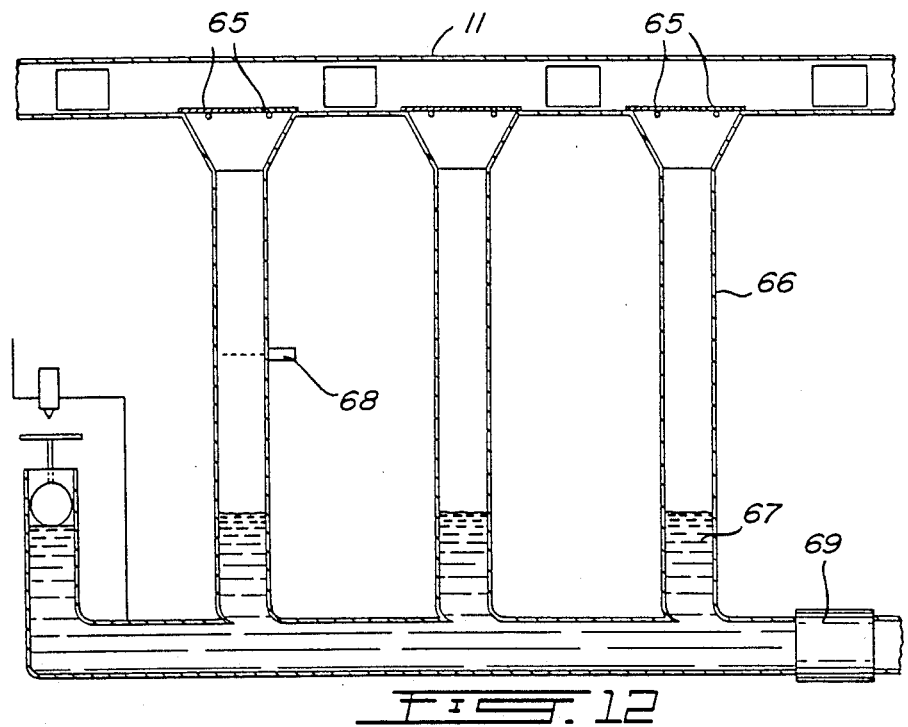
FIG. 12
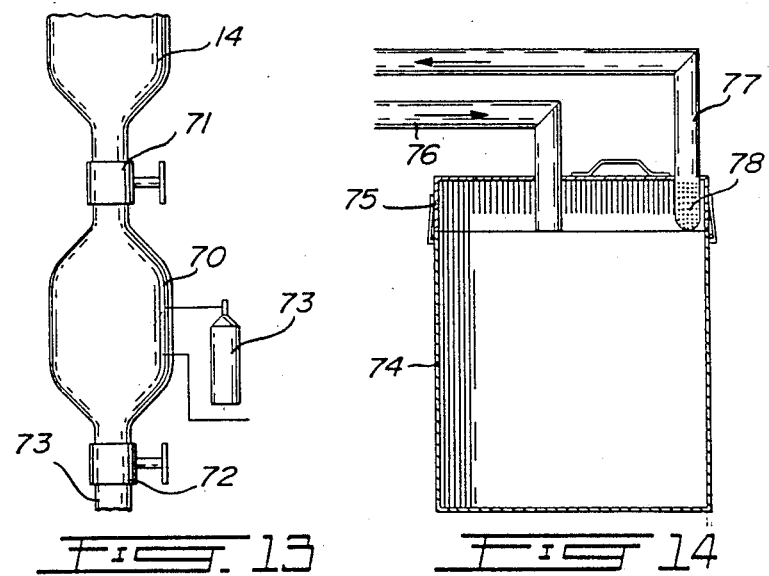
FIG. 13
FIG. 14

PEST TRAPPING AND EXTERMINATION SYSTEM

BACKGROUND OF INVENTION

1. Field of Invention

The present invention relates to a pest trapping and extermination system which comprises an elongated conduit which may be installed in the lower part of walls of buildings or at the base of existing walls whereby to trap pests located in areas adjacent the walls, and to exterminate the pests trapped in the conduit.

2. Description of Prior Art

Various pest trapping and extermination devices are known for exterminating all types of small pests, such as rats, mice, bugs, etc. that usually infest homes or commercial buildings. However, there is a need to provide a device or system which is permanent and fully automatic whereby pests are attracted to the device and destroyed therein. It is also desirable to have a system wherein the pests are destroyed and discarded automatically.

SUMMARY OF INVENTION

It is a feature of the present invention to provide a pest trapping and extermination system which comprises an elongated enclosed conduit member which is securable to the base of walls or inside walls and wherein pests are attracted therein and led to an extermination means associated with the conduit.

Another feature of the present invention is to provide a pest trapping and extermination system which is fully automatic and which is adaptable to residential and commercial buildings as well as other areas where pests are usually found, such as in manholes, sewers, etc.

According to the above features, from a broad aspect, the present invention provides a pest trapping and extermination system comprising an elongated enclosed conduit member having attachment means for securing same against a wall in an area where pests are to be trapped. Directing means is secured to the conduit member for directing pests entering the conduit in a predetermined direction. One or more entrances are provided in the conduit for access to the interior thereof. Closure means are further provided to cut off access to the entrances. Extermination means is associated with the conduit to destroy the pests trapped therein.

BRIEF DESCRIPTION OF DRAWINGS

A preferred embodiment of the present invention will now be described with reference to the examples thereof as illustrated in the accompanying drawings, in which:

FIG. 1 is a perspective view of a pest trapping and extermination system constructed in accordance with the present invention;

FIG. 2 is a fragmented section view showing the construction of the conduit together with an entrance and other associated devices;

FIG. 3 is a fragmented section view showing an alternate construction of the conduit member;

FIG. 4 is a fragmented perspective view showing one form of construction of the entrance closing means;

FIG. 5 is a perspective view showing an alternative construction of the entrance closing means;

FIG. 6 is a plan view of a resistive detecting device inside the conduit;

FIG. 12 is a schematic view showing a still further version of an extermination means;

FIG. 13 is a simplified side view showing a still further version of an extermination means; and FIG. 14 is a simplified side view showing a still further version of an extermination means.

DESCRIPTION OF PREFERRED EMBODIMENTS

Figure 7:
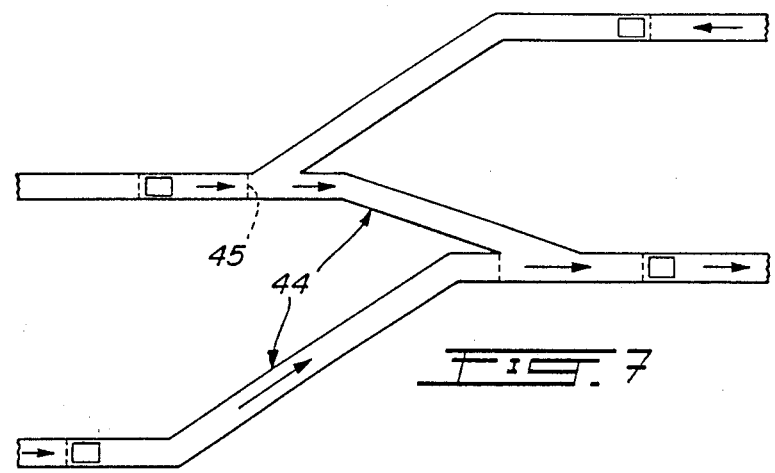
FIG. 7 is a schematic view of a labyrinth enclosed conduit.

Referring now to the drawings, and more particularly to FIGS. 1 to 3, there will be described the pest trapping and extermination system 10 of the present invention. The system comprises an elongated enclosed conduit member 11 having attachment means, such as tabs 12 as shown in FIG. 2, or a flange wall 12' as shown in FIG. 3, for securing the channel member to the base of existing wall or inside the walls during construction of a new building. The conduit is provided with entrances 13 to permit access for pests to the interior of the conduit. It is well known that all sorts of pests, such as mice, rats, insects, bugs, all find refuge along the base of walls as they are naturally led to that area to seek and escape. Accordingly, these pests would find refuge inside the conduit 11.

Once the pests have entered the conduit 11 through entrances 13 the pests are directed in a predetermined direction towards an extermination means. The extermination means as shown in FIG. 1 is a filter housing 14 having a liquid 15 therein to drown or poison the pests. The pests are led to this extermination means by directing means, which is herein shown in FIG. 1 and being constituted by a vacuum pump 16 directing air under pressure in the conduit from one end to the other. However, before the pump 16 is activated it is necessary to close the entrances 13 so that the pests upstream of an entrance will not leave the conduit. It is not necessary for the enclosure to be absolutely sealed as all that is necessary to lead the pests towards the exterminator is a small air current forcing the pests to displace themselves in the direction of the air flow. Smaller insects would be displaced more easily as would a rat or such larger pests. As shown in FIGS. 1 and 2, the entrances 13 are closed by a solenoid or piston 17 which is actuated by a control circuit 18. Detectors, such as the resistive detector 19 as shown in FIG. 6 or other types, are provided along the conduit and send a signal to the control circuit 18 to actuate all of the door closing solenoids 17 to close the trap doors upon detection of pests therein and to automatically start the vacuum pump 16. In another embodiment the control circuit 18 may simply actuate the door closing means at predetermined time intervals thereby starting the vacuum pump at such intervals to evacuate the conduit. Thus, sensors would not be necessary.

In the embodiment of FIG. 1 there is also shown a reservoir 20 having a sweet liquid 21 which is injected into the air stream to deposit goblets of this liquid along the conduit whereby to attract pests therein. Also, the extermination chamber 14 is provided with a discharge conduit 22 where the solenoid actuated valve 23 is connected therein and whereby to evacuate the contents of the chamber 14 into a drain pipe 24. A supply reservoir 25 is also provided with a check valve 26 and an evacuation valve 27 whereby to supply the extermination chamber 14 after it has been drained. All of the solenoid valves are controlled by the control circuit 18.

As shown in FIG. 2, there may also be provided small sections of internal open ended channels 28 disposed adjacent a bottom corner of the conduit 11 and wherein small insects will naturally lodge themselves when entering the conduit 11. When the vacuum pump is started the air flow through these channels sucks the insects out into the extermination chamber.

The detection means may also be provided by sensors 29 located at predetermined distances along conduit 11. Also, the directing means could be constituted by one or more ultrasonic whistles or flashing lights 30 secured to the channels to direct the pests therein in a predetermined direction towards the extermination device. FIG. 3 shows a conduit means which was conceived to be secured to the base of walls of existing buildings. The conduit 11 is secured by the flange 12' and a cap 31 snaps over the top end of the flange 12, after the installation, to imitate a base board runner and to conceal the fasteners and the flange. Also, electrical wires 32, or other types of wiring, may be concealed under the cap 31. These wires 32 are required when the solenoids 17 are used which operate a trap door 33, such as shown in FIG. 5.

Referring now to FIGS. 4 and 5, there will be described two alternate constructions of the entrance closing means. In the embodiment of FIG. 4, the conduit 11 is constituted by a double conduit, namely a lower conduit 11' and an upper conduit 11". When the vacuum pump is actuated air will flow in the direction of arrows 34 thereby applying pressure against a door closing flap 35 to move same against the spring biasing force of the coil spring 36 coiled around the pivot pin 37. The trap door is constituted by a semicircular disc 38 which is caused to turn in the direction of arrow 39 when the vacuum pressure is applied against the flap 35. The door 38 will be displaced sufficiently to close the entrance 13. Accordingly, solenoids are not required with this door closing means.

As shown in FIG. 5, the solenoid has a piston 40 which is secured to the sliding trap door 33, which is movable in adjacent channels 41 to close the entrance 13. The solenoid is actuated by an electrical signal on wires 32 and which are generated by the control circuit 18.

FIG. 6 shows the construction of one of the detection means, and as previously described, the resistive detector 19 consists of an array of a conductive material which is disposed on a floor surface 42 of the conduit 11 and is connected to a control device 43 which senses a change in the resistance of the conductive material when an insect or a rodent is displaced thereover. This control device 43 sends a signal to the control circuit 18 indicating the presence of pests within the conduit.

Figure 8:
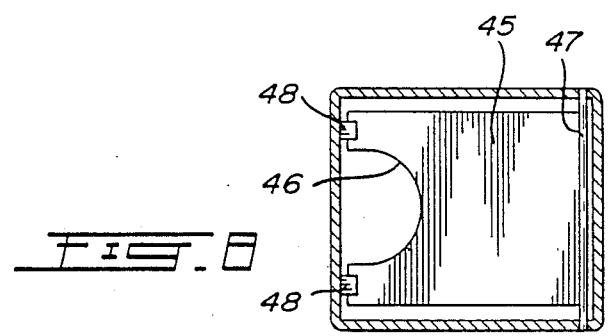
FIG. 8 is a plan view of a trap door within the conduit.
Figure 9:
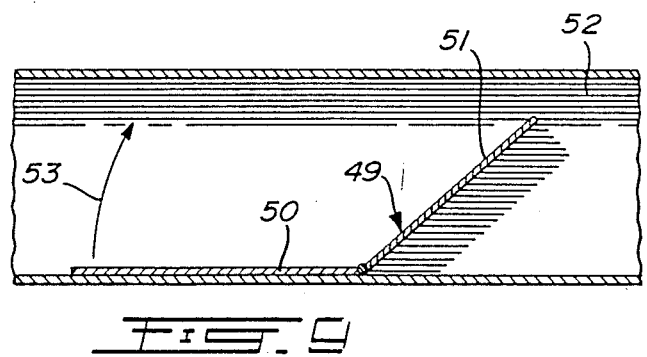
FIG. 9 is a sectional side of a further version of the trap door within the conduit.

FIGS. 7 to 9 show the construction of a labyrinth type of conduit arrangement 44 and wherein a plurality of trap doors 45 are provided. This type of arrangement is particularly useful for small rodents, such as rats and mice, wherein these rodents may be led to an extermination device and in which there is provided an attractive scent. The rodent when encountering the trap door 45 is led to pass through the door by pushing through the opening 46 therein. As soon as pressure is applied to the trap door in a forward direction, the door will swing open on its vertical hinge 47 which is spring biased. Once the rodent passes through the door the door automatically swings back and is arrested against the stopper members 48. Accordingly, the rodent can only pass through this door in a forward direction.

Another type of trap door that is used in these labyrinth conduits is comprised of a floor flap door 49 which comprises a floor flap section 50 and a door section 51. The flap section 50 is larger than the door 51 and accordingly heavier and biases the door 51 in a semiclosed position, as shown in FIG. 9. The door 51 is angulated so that there is an opening 52 at the top thereof to attract a rodent in the forward direction. When the rodent applies pressure on the door section 51 the flap 50 moves up in a direction of arrow 53, and the rodent passes through the door section 51. However, the rodent cannot come back in the same direction, as the the floor flap 50 falls back to its initial position by gravity and lifts the door section 51 upwards.

Figure 10:
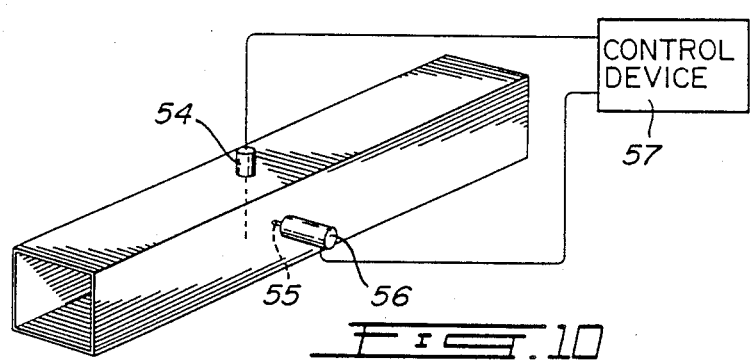
FIG. 10 is a perspective schematic view showing the construction of an extermination means.

Referring now to FIGS. 10 to 14, there will be described various examples of extermination means usable with the present invention. As shown in FIG. 10, the extermination means is an automatic system which comprises a movement detector 54 for sensing the presence and location of a large pest in the conduit, and a piston-acutated rod or dart 55 secured to cylinder 56. When the sensor 54 detects the presence of a pest the control circuit 57 actuates the cylinder 56 to cause the dart at the end of the piston rod 55 to extend quickly and retract. Any large pest within the enclosure is then killed or wounded and is aspirated away by the vacuum system.

Figure 11:
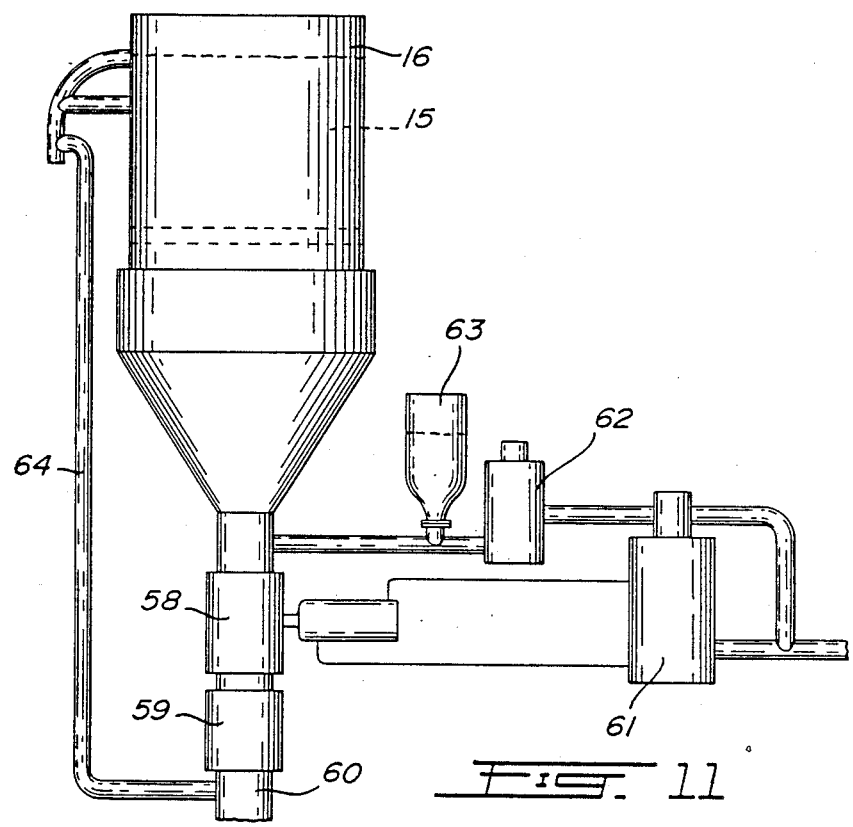
FIG. 11 is a simplified side view showing a further version of an extermination means.

Referring now to FIG. 11, there is shown another version of the filter chamber, and as herein shown, the vacuum housing 16 has a lower portion thereof filled with liquid 15. On a periodic basis the chamber 16 is evacuated by a discharge valve 58 sending the contents of the liquid through a garburator attraction device 59 pulverizing any large size pests in the liquid, and discharging same in the drain conduit 60. Additional water is fed through the valve 58 via a second solenoid 61. A disinfectant soap may also be injected with the liquid during the discharge cycle, and this is done by actuating a further solenoid 62 upstream of the disinfectant liquid container 63. A drain pipe 64 is also provided to discharge any overflow liquid within the container 16 through the drain 60.

FIG. 12 shows a further version of the pest trapping and extermination system. As herein shown, the conduit 11 is provided with a plurality of trap doors 65 which are actuable by rodents to cause the rodent to fall into a discharge chute 66 which is filled with water 67. A detector 68 may be provided along the chute to detect the passage of rodents therein. After a predetermined time limit after the detector has sensed the presence of one or more rodent, the conduit is flushed through the discharge valve 69. The cycle is also sufficiently long to ensure that the rodent has drowned.

FIG. 13 shows a still further example of an extermination device. As herein shown, the base of the extermination housing 14 is connected to a gas chamber 70 through a valve 71 having a sufficiently large opening to discharge large pests therethrough. A discharge valve 72 is located at the bottom of the gas chamber 70. A gas bottle 73 supplies gas to the chamber 70. Once the pest has been discharged from the chamber, the valves 71 and 72 are closed and a small amount of gas is automatically injected into the chamber. After a predetermined time limit the valves are opened and a drain liquid, such as water, flushes the chamber 70 and its contents into a drain pipe 73.

FIG. 14 shows a still further embodiment of the extermination means, and as herein shown, the extermination means is provided by a suffocation chamber 74 having a removable cover 75 to periodically clean its contents. An inlet pipe 76 admits a suffocating agent into the air fed to the chamber. An outlet conduit 77 having a filter end 78 completes the air flow through the suffocation chamber.

It is within the ambit of the present invention to cover any obvious modifications of the examples of the preferred embodiment described herein, provided such modifications fall within the scope of the appended claims. For example, the conduit could be constructed of metal sheeting, plastics, or any suitable material. The system could also be constructed of any combination of door closing means or extermination means as described herein.

I claim:

1. An automatic pest trapping and extermination system to capture and destroy pests, said system comprising an elongated enclosed conduit member having attachment means for securing same against a wall in an area where pests are to be trapped, directing means secured to said conduit member for directing pests entering said conduit in a predetermined direction, one or more entrances in said conduit for access to the interior thereof, detection means for sensing the presence of one or more pests within said conduit, closure means to cut off access to said entrances, extermination means associated with said conduit to destroy said pest trapped therein, and control circuit means for closing said entrance closing means and actuating said directing means upon actuation of said detection means, said directing means being a vacuum pump secured to said conduit for aspirating or inducing said pests to move toward said extermination means, a timer to periodically actuate said pump and direct said pests in said conduit toward said extermination means, said extermination means having a discharge outlet to evacuate the contents of pests destroyed therein automatically after said extermination means has completed its cycle, said discharge outlet being connected to a drain pipe, said directing means being comprised of one or more inner trap doors secured inside said conduit member, said trap doors having an opening therein to attract said pests to a trap door actuating location to permit said pests to proceed beyond said trap door in a single direction, said trap door having a floor flap section hinged on a hinge pin to a door section, said floor flap section being heavier than said door section to bias said door section to a closed operating position when there is no force acting on one side of said door section.

2. A pest trapping and extermination system as claimed in claim 1 wherein said closure means comprises a sliding door slidingly retained adjacent each said openings, a solenoid connected to said sliding door for closing same upon receiving a signal from said control circuit means.

3. A pest trapping and extermination system as claimed in claim 1 wherein said conduit is a double channel conduit, said double channel forming a closed loop circuit with said vacuum pump, said entrance closing means being actuated by said vacuum pressure.

4. A pest trapping and extermination system as claimed in claim 3 wherein said channels are disposed in side-by-side relationship, said openings being provided in a lowermost one of said channels, a trap door mounted on a hinge pin extending into an uppermost one of said channels, an air pressure vane secured to said hinge pin inside said uppermost channel, a door flap secured to a connecting end of said hinge pin above said opening, said door flap being displaced on said hinge pin to obstruct said opening when said air pressure vane is displaced by air pressure created by said vacuum pump to impart axial rotation to said hinge pin and rotate said door flap to a closed position.

5. A pest trapping and extermination system as claimed in claim 1 wherein said detection means comprises one or more mechanically actuated switches secured along said conduit.

6. A pest trapping and extermination system as claimed in claim 1 wherein said detection means comprises a resistive array of a conductive material disposed on a floor surface of said conduit, and circuit means to detect any fluctuation in the resistance of said material caused by pests present thereon.

7. A pest trapping and extermination system as claimed in claim 1 wherein there is further provided internal open ended channels within said conduit for attracting small pests therein.

8. A pest trapping and extermination system as claimed in claim 1 wherein there is further provided a cover member removably securable to a securing flange of said conduit, said cover member extending over a top wall of said conduit and concealing fasteners secured in said flange, and further providing a concealed channel for the passage of wiring therein.

9. A pest trapping and extermination system as claimed in claim 1 wherein said extermination means is a filter chamber connected to an end of said conduit through an outlet conduit, a liquid in said filter chamber, an air return conduit connected to said filter chamber and said vacuum pump.

10. A pest trapping and extermination system as claimed in claim 9 wherein said filter chamber is provided with a drain conduit, valve means in said drain conduit to evacuate said filter chamber, and reservoir means to supply said liquid to said filter chamber.

11. A pest trapping and extermination system as claimed in claim 9 wherein a trashing device is connected to said outlet conduit to pulverize any large size pest in said liquid, and disinfectant injection means connected to said outlet conduit to discharge a disinfectant liquid in said outlet conduit.

12. A pest trapping and extermination system as claimed in claim 1 wherein said extermination means is a gas chamber connected at an outlet end of said conduit.

13. A pest trapping and extermination system as claimed in claim 1 wherein said extermination means is an incinerating chamber, a gas reservoir connected to said chamber, and ignition means connected to said chamber.

14. A pest trapping and extermination system as claimed in claim 1 wherein said extermination means comprises a movement detector for sensing the presence and location of a pest in said conduit, and a piston actuated rod having a pointed end for striking said detected pest.

* * * * *